United States Patent
Loehr et al.

(10) Patent No.: US 11,805,537 B2
(45) Date of Patent: Oct. 31, 2023

(54) MULTIPLE RESOURCE ALLOCATION MODE CONFIGURATIONS

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/982,344

(22) Filed: Nov. 7, 2022

(65) Prior Publication Data

US 2023/0063750 A1    Mar. 2, 2023

Related U.S. Application Data

(63) Continuation of application No. 16/825,062, filed on Mar. 20, 2020, now Pat. No. 11,497,025.
(Continued)

(51) Int. Cl.
*H04W 72/53* (2023.01)
*H04W 4/40* (2018.01)
(Continued)

(52) U.S. Cl.
CPC ........... *H04W 72/53* (2023.01); *H04W 4/40* (2018.02); *H04W 28/0278* (2013.01);
(Continued)

(58) Field of Classification Search
CPC ....... H04W 72/53; H04W 4/40; H04W 72/56; H04W 72/23; H04W 28/0278; H04W 72/1263; H04W 92/18
See application file for complete search history.

(56) References Cited

U.S. PATENT DOCUMENTS

2018/0054755 A1* 2/2018 Lee .................. H04W 72/21
2019/0124015 A1* 4/2019 Loehr ................ G06F 21/43
(Continued)

FOREIGN PATENT DOCUMENTS

EP     3244577 A1    11/2017

OTHER PUBLICATIONS

Vivo, "Discussion on support of simultaneous mode 1 and mode 2", 3GPP TSG-RAN WG2 Meeting #105 R2-1901118, Feb. 25-Mar. 1, 2019, pp. 1-4.
(Continued)

*Primary Examiner* — Ajay Cattungal
(74) *Attorney, Agent, or Firm* — Kunzler Bean & Adamson

(57) ABSTRACT

Apparatuses, methods, and systems are disclosed for multiple resource allocation mode configurations. One method includes receiving information indicating a plurality of resource allocation mode configurations. Each resource allocation mode configuration corresponds to a logical channel of a plurality of logical channels. The method includes determining a plurality of data transmission scheduling modes for the plurality of logical channels. Each data transmission scheduling mode corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode. The method includes transmitting a buffer status report based on the plurality of the data transmission scheduling modes.

16 Claims, 4 Drawing Sheets

Related U.S. Application Data

(60) Provisional application No. 62/821,266, filed on Mar. 20, 2019.

(51) Int. Cl.

| | | |
|---|---|---|
| *H04W 28/02* | (2009.01) | |
| *H04W 72/1263* | (2023.01) | |
| *H04W 72/23* | (2023.01) | |
| *H04W 72/56* | (2023.01) | |
| *H04W 92/18* | (2009.01) | |

(52) U.S. Cl.
CPC ....... *H04W 72/1263* (2013.01); *H04W 72/23* (2023.01); *H04W 72/56* (2023.01); *H04W 92/18* (2013.01)

(56) References Cited

U.S. PATENT DOCUMENTS

| | | | |
|---|---|---|---|
| 2019/0342903 A1* | 11/2019 | Yu | H04L 5/00 |
| 2019/0364588 A1* | 11/2019 | Lu | H04L 1/1887 |
| 2022/0070876 A1* | 3/2022 | Bangolae | H04W 76/27 |
| 2022/0116147 A1* | 4/2022 | Hou | H04L 5/0055 |
| 2022/0124678 A1* | 4/2022 | Lee | H04W 72/23 |
| 2022/0159628 A1* | 5/2022 | Bangolae | H04W 72/04 |

OTHER PUBLICATIONS

3GPP, "3rd Generation Partnership Project; Technical Specification Group Core Network and Terminals; User Equipment (UE) to V2X control function; protocol aspects; Stage 3 (Release 15)", 3GPP TS 24.386 V15.2.0, Dec. 2018, pp. 1-35.

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.4.0, Dec. 2018, pp. 1-131.

3GPP, "3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.2.0, Dec. 2018, pp. 1-52.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, pp. 1-933.

3GPP, "3rd Generation Partnership Project; Technical Specification Group Radio Access Network; NR; Medium Access Control (MAC) protocol specification (Release 15)", 3GPP TS 38.321 V15.4.0, Dec. 2018, pp. 1-77.

\* cited by examiner

MULTIPLE RESOURCE ALLOCATION MODE CONFIGURATIONS

CROSS-REFERENCE TO RELATED APPLICATIONS

This application is a continuation application of patent application Ser. No. 16/825,062 filed on Mar. 20, 2020, which claims priority to U.S. patent application Ser. No. 62/821,266 entitled "CONCURRENT MODE 1 AND MODE 2 CONFIGURATION FOR SIDELINK VEHICULAR COMMUNICATION" and filed on Mar. 20, 2019 for Joachim Loehr, which is incorporated herein by reference in its entirety.

FIELD

The subject matter disclosed herein relates generally to wireless communications and more particularly relates to multiple resource allocation mode configurations.

BACKGROUND

The following abbreviations are herewith defined, at least some of which are referred to within the following description: Third Generation Partnership Project ("3GPP"), $5^{th}$ Generation ("5G"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Busy Ratio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Dedicated Short Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Out-Of-Coverage ("OOC"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), SL Radio Bearer ("SLRB"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCP"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), SL LCH ("SLLCH"), SL SCH ("SL-SCH"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink RSSI ("S-RSSI"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, a user equipment may have a resource allocation mode configuration.

BRIEF SUMMARY

Methods for multiple resource allocation mode configurations are disclosed. Apparatuses and systems also perform the functions of the methods. One embodiment of a method includes receiving information indicating a plurality of resource allocation mode configurations, wherein each resource allocation mode configuration of the plurality of resource allocation mode configurations corresponds to a logical channel of a plurality of logical channels. In some embodiments, the method includes determining a plurality of data transmission scheduling modes for the plurality of logical channels, wherein each data transmission scheduling mode of the plurality of data transmission scheduling modes corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode. In various embodiments, the method includes transmitting a buffer status report based on the plurality of the data transmission scheduling modes.

One apparatus for multiple resource allocation mode configurations includes a receiver that receives information indicating a plurality of resource allocation mode configurations, wherein each resource allocation mode configuration of the plurality of resource allocation mode configurations corresponds to a logical channel of a plurality of logical channels. In certain embodiments, the apparatus includes a processor that determines a plurality of data transmission scheduling modes for the plurality of logical channels, wherein each data transmission scheduling mode of the plurality of data transmission scheduling modes corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode. In some embodiments, the apparatus includes a transmitter that transmits a buffer status report based on the plurality of the data transmission scheduling modes.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
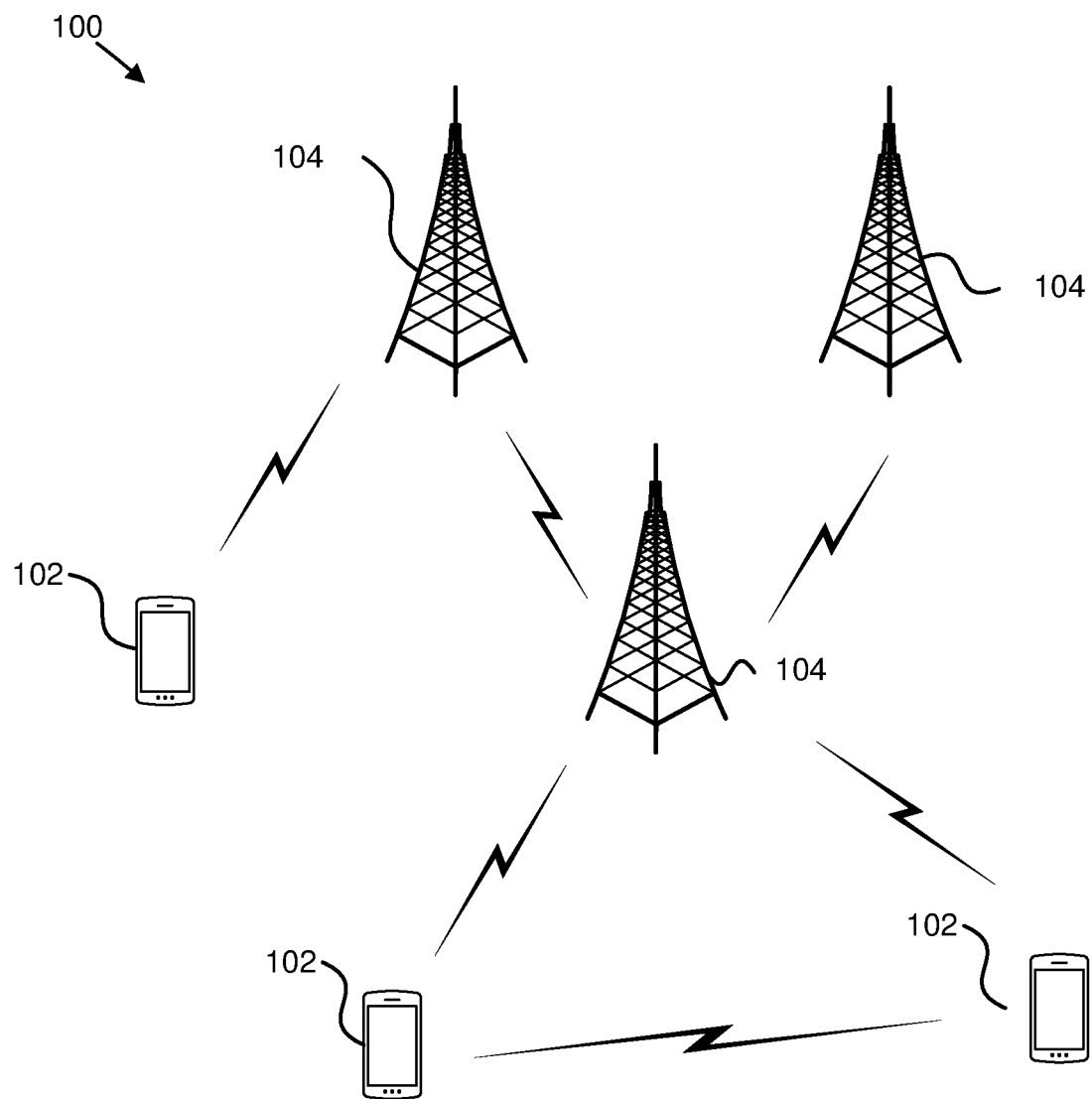
FIG. 1 is a schematic block diagram illustrating one embodiment of a wireless communication system for multiple resource allocation mode configurations.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for multiple resource allocation mode configurations. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive information indicating a plurality of resource allocation mode configurations, wherein each resource allocation mode configuration of the plurality of resource allocation mode configurations corresponds to a logical channel of a plurality of logical channels. In some embodiments, the remote unit 102 may determine a plurality of data transmission scheduling modes for the plurality of logical channels, wherein each data transmission scheduling mode of the plurality of data transmission scheduling modes corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode. In various embodiments, the remote unit 102 may transmit a buffer status report based on the plurality of the data transmission scheduling modes. Accordingly, the remote unit 102 may be used for multiple resource allocation mode configurations.

Figure 2:
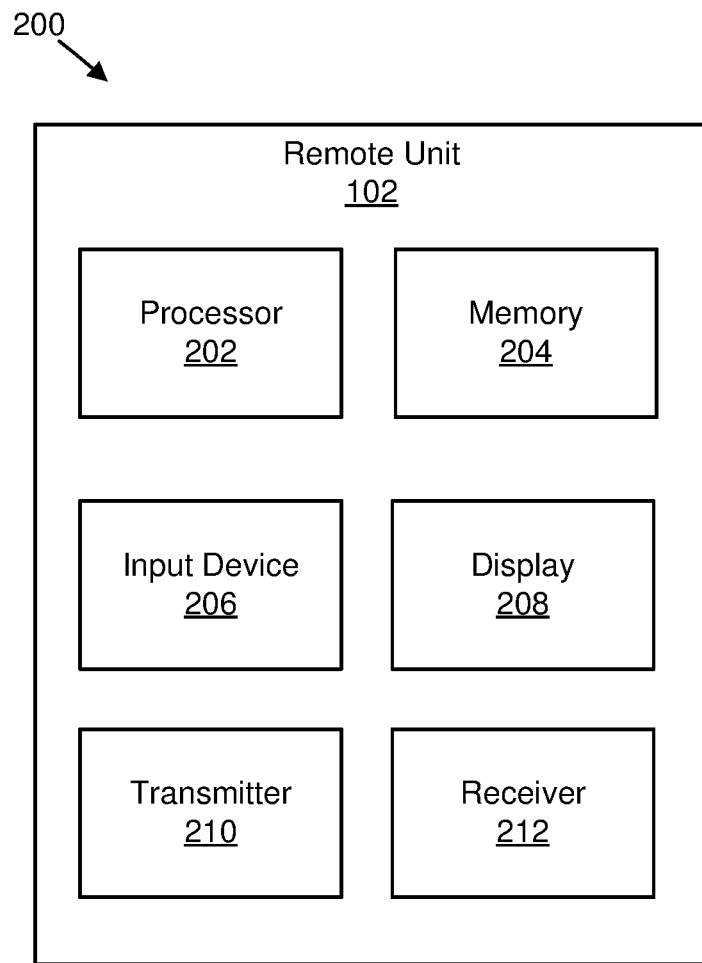
FIG. 2 is a schematic block diagram illustrating one embodiment of an apparatus that may be used for multiple resource allocation mode configurations.

FIG. 2 depicts one embodiment of an apparatus 200 that may be used for multiple resource allocation mode configurations. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine a plurality of data transmission scheduling modes for a plurality of logical channels, wherein each data transmission scheduling mode of the plurality of data transmission scheduling modes corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In some embodiments, the receiver 212 may receive information indicating a plurality of resource allocation mode configurations, wherein each resource allocation mode configuration of the plurality of resource allocation mode configurations corresponds to a logical channel of a plurality of logical channels. In various embodiments, the transmitter 210 transmits a buffer status report based on a plurality of the data transmission scheduling modes. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
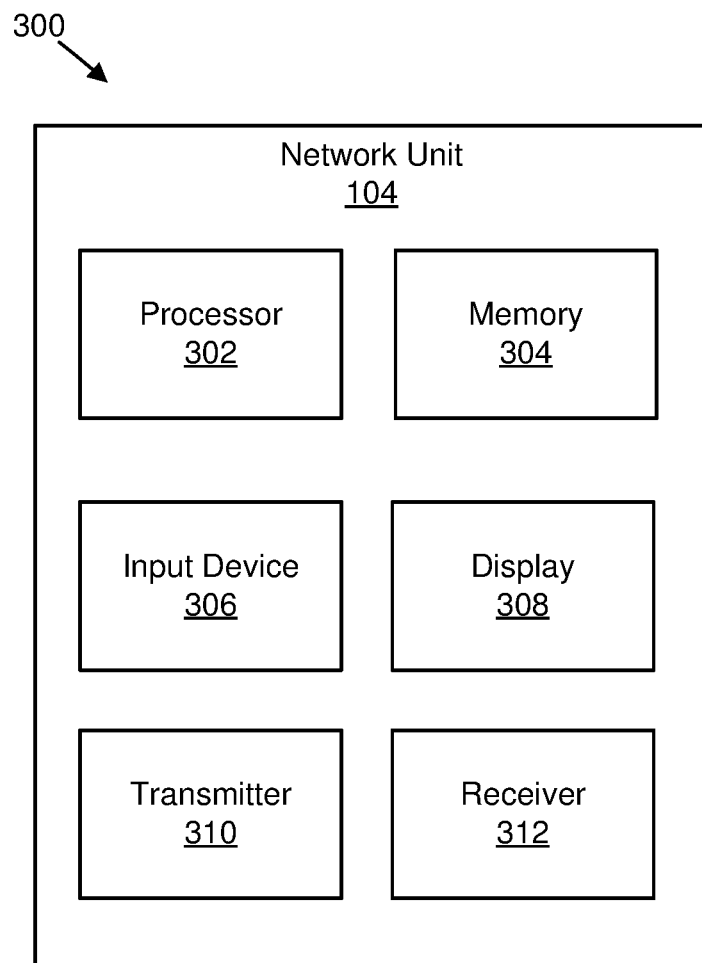
FIG. 3 is a schematic block diagram illustrating one embodiment of an apparatus that may be used for multiple resource allocation mode configurations.

FIG. 3 depicts one embodiment of an apparatus 300 that may be used for multiple resource allocation mode configurations. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit information to the remote unit 102 and/or the receiver 312 may receive information from the remote unit 102.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, two resource allocation modes may be used. For example, LTE V2X communication and/or NR V2X communication may use two resource allocation modes. These two resource allocation modes may be referred to as Mode 3 and Mode 4 for LTE V2X. Modes 3 and 4 may support direct V2X communications but may differ on how they allocate the radio resources. For example, for Mode 3, resources may be allocated by a cellular network (e.g., eNB). In contrast, Mode 4 may not require cellular coverage, and vehicles may autonomously select their radio resources using a distributed scheduling scheme supported by congestion control mechanisms. Mode 4 may be considered a baseline mode and may represent an alternative to 802.11p or DSRC.

In various embodiments, both resource allocation Modes 3 and 4 have been designed to satisfy latency requirements, accommodate high Doppler spreads, and/or accommodate high density of vehicles for V2X communications. In certain embodiments, a maximum allowed latency may vary between 20 ms and 100 ms, depending on an application. In some embodiments, Mode 3 may use a centralized eNB scheduler. In various embodiments, a vehicular UE and an eNB use a Uu interface to communicate (e.g., sending BSR and/or SR from a transmitting V2X UE to the eNB and receiving a SL grant in response on a PDCCH (e.g., DCI)). In certain embodiments, Mode 4 uses a PC5 interface which offers direct LTE SL communication between two vehicular UEs and/or employs distributed UE scheduling. In some embodiments, V2X Mode 4 operates without infrastructure support (although the UEs could be in eNB coverage). In various embodiments, V2X resources are shared with an LTE uplink. In certain embodiments, V2X Mode 4 may support both LTE duplexing modes (e.g., time and frequency division duplexing). In some embodiments, Mode 4 may use a specific resource pool configuration and SPS to select and reserve resources for transmission.

In some embodiments, SPS may support services that have a deterministic latency, such as voice services. In certain embodiments, Mode 4 may also support services that have a deterministic latency and may use sensing to determine suitable SPS transmission opportunities (e.g., a set of subframes and sub-channels for transmission). In some embodiments, a candidate single-subframe resource includes one or more (e.g., L) contiguous subchannels in a single subframe, depending on the message size. In various embodiments, a UE may select a set of candidate resources within a selection window that spans a number of subframes and contains M single-subframe resources. In certain embodiments, a UE may continuously monitor subframes and take notes of decoded SCI and S-RSSI measurements. In some embodiments, a UE may consider the last 1000 subframes for selecting candidate resources according to defined rules.

In certain embodiments, NR V2X may use LTE V2X operation as a baseline. In various embodiments, there may be a centralized and a distributed scheduling mode (e.g., referred to as Mode 3 and Mode 4 in LTE V2X) in NR V2X communication. The two resource allocation modes in NR V2X may be referred to as resource allocation Mode 1 and Mode 2. In contrast to LTE V2X communication, a NR V2X UE may be concurrently configured with resource allocation Mode 1 and Mode 2. In LTE V2X, a V2X UE may use Mode 3 or Mode 4, but never the two modes simultaneously.

In some embodiments, if a transmitting V2X UE is configured with two resource allocation modes concurrently (e.g., a serving cell supports both resource selection modes), rules may be defined for the transmitting V2X UE for how to use the two resource allocation modes for SL communications (e.g., when to use Mode 1 operation and when to use Mode 2 operation). If there are no such rules, a V2X transmitting UE may request SL resources by indicating a certain buffer status to a gNB and before receiving a SL grant from the gNB the UE may transmit SL data using Mode 2. This may lead to a waste of allocated resources (e.g., the SL grant may allocate SL resources which cannot be fully used by the UE because there is not sufficient data remaining in a buffer for transmission).

Described herein are various methods for resource efficient SL data transmission for configurations in which a V2X UE is configured with two resource allocation modes concurrently.

As used herein, the term eNB and/or gNB may be used for a base station but may be replaceable by any other radio access node (e.g., BS, eNB, gNB, AP, NR, etc.). Furthermore, while various embodiments described herein may be described in the context of 5G NR, the embodiments may be equally applicable to other mobile communication systems supporting serving cells and/or carriers, such as systems configured for SL communication over PC5 interface.

In a first embodiment, a V2X transmitting UE performs two sidelink transmission procedures in parallel. The two sidelink transmission procedures include one transmission procedure for a gNB scheduled resource selection mode (e.g., Mode 1 in which a MAC entity is configured to receive a sidelink grant dynamically on PDCCH) and one transmission procedure for the UE autonomous resource selection mode (e.g., Mode 2 in which the MAC entity is configured for autonomous resource selection). In some embodiments, performing two sidelink transmission procedures concurrently may imply that a V2X transmitting UE considers certain SLRBs as Mode 1 and certain SLRBs as Mode 2. For example, SLRBs or the corresponding SL LCHs for a SL-SCH data transmission procedure may be considered to use resource allocation Mode 1 (e.g., SR and/or BSR procedure, SL grant reception, LCP procedure), and other SLRBs or the corresponding SL LCHs may be considered for a SL-SCH data transmission procedure to use resource allocation Mode 2. In various embodiments, a SLRB and/or a SL LCH may be configured with supported resource allocation modes. In such embodiment, there may be an indication about whether data of a corresponding SL LCH and/or SLRB may be transmitted on the SL-SCH using a SL grant allocated by a network entity such as gNB (e.g., Mode 1), a SL grant autonomously selected by a UE (e.g., Mode 2), or both.

In some embodiments, a V2X transmitting UE considers (e.g., for a sidelink grant received from a gNB—on PDCCH) only SL LCHs and/or SLRBs for a TB generation procedure, e.g., during LCP procedure, that are configured to use resource allocation Mode 1 (e.g., sidelink grant allocated by the gNB). In such embodiments, the V2X transmitting UE may perform the LCP procedure/TB generation procedure by first selecting those LCHs from a set of SL LCHs (e.g., a set of configured SL LCHs) that satisfy a resource allocation mode condition (e.g., a configured allowedResourceAllocationMode includes Mode 1). Moreover, in such embodiments, each MAC PDU and/or TB that is transmitted on a SL-SCH on a SL resource is associated with a resource allocation mode.

The first embodiment may be realized, in one embodiment, based on the logical channel prioritization shown in Table 1.

TABLE 1

Logical Channel Prioritization

The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in TS 36.323 [4], the MAC entity shall map different sidelink logical channels which correspond to the same PDCP entity onto different carriers in accordance with subclause 5.14.1.5, or onto different carriers of different carrier sets (if configured in allowedCarrierFreqList for the corresponding destination). For a given sidelink logical channel, it is up to UE implementation which carrier set to select among the carrier sets configured in allowedCarrierFreqList for the corresponding destination.
The MAC entity shall perform the following Logical Channel Prioritization procedure either for each SCI transmitted in an SC period in sidelink communication, or for each SCI corresponding to a new transmission in V2X sidelink communication:
- The MAC entity shall allocate resources to the sidelink logical channels in the following steps:
  - Only consider sidelink logical channels not previously selected for this SC period and the SC periods (if any) which are overlapping with this SC period, to have data available for transmission in sidelink communication;
  - Only consider sidelink logical channels which meet the following conditions:
    - allowed on the carrier where the SCI is transmitted for V2X sidelink communication, if the carrier is configured by upper layers according to TS 36.331 [8] and TS 24.386 [15];
    - having a priority whose associated threshCBR-FreqReselection is no lower than the CBR of the carrier when the carrier is (re-)selected in accordance with 5.14.1.5;
    - having the same resource allocation mode configured as the resource allocation mode associated with this MAC PDU/SCI
  - Only consider one sidelink logical channel among sidelink logical channels corresponding to same PDCP entity, if duplication is activated as specified in TS 36.323 [4].
  - Step 0: Select a ProSe Destination, having the sidelink logical channel with the highest priority, among the sidelink logical channels having data available for transmission and having the same transmission format as the one selected corresponding to the ProSe Destination;
NOTE: The sidelink logical channels belonging to the same ProSe Destination have the same transmission format.
- For each MAC PDU associated to the SCI:
  - Step 1: Among the sidelink logical channels belonging to the selected ProSe Destination and having data available for transmission, allocate resources to the sidelink logical channel with the highest priority;
  - Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.
- The UE shall also follow the rules below during the scheduling procedures above:
  - the UE should not segment an RLC SDU (or partially transmitted SDU) if the whole SDU (or partially transmitted SDU) fits into the remaining resources;
  - if the UE segments an RLC SDU from the sidelink logical channel, it shall maximize the size of the segment to fill the grant as much as possible;
  - the UE should maximise the transmission of data;
- if the MAC entity is given a sidelink grant size that is equal to or larger than 10 bytes (for sidelink communication) or 11 bytes (for V2X sidelink communication) while having data available for transmission, the MAC entity shall not transmit only padding.

In one configuration of the first embodiment, an LCH configuration (e.g., that indicates whether data of a corresponding SL LCH and/or SLRB may be transmitted using a SL grant allocated by a gNB (Mode 1)), a SL grant autonomously selected by the UE (Mode 2), or both may be only respected by a V2X transmitting UE if a serving cell supports both resource allocation modes or if the UE is configured for simultaneous usage of Mode 1 and Mode 2 resource allocation modes. If there is only one resource allocation mode available in a serving cell or if a UE is in OOC, the UE may ignore an LCH configuration (e.g., IE allowedResourceAllocationMode—data of all SL LCHs may be transmitted in the available resource allocation mode).

In certain embodiments, a V2X UE may be configured with a ratio of how much of its SL data (e.g., SL data available for transmission) may be transmitted using resource allocation Mode 1 versus the resource allocation Mode 2. The ratio may be determined and configured by a gNB. The ratio may be used to control and/or steer a load and/or congestion in resource pools used for the corresponding resource allocation modes. In various embodiments, a UE may be configured with a priority threshold for determining which resource allocation mode to be used for SL LCHs. For example, all SL LCHs having a higher logical channel priority than a configured priority threshold may use one resource allocation mode (e.g., Mode 1), while SL LCHs having a logical channel priority lower than or equal to the configured priority threshold may use the other resource allocation mode (e.g., Mode 2). The configured priority threshold may be broadcast in a serving cell or configured individually for a UE.

In some embodiments, a V2X UE may be configured with a CBR threshold. The CBR threshold may be used to determine whether to use resource allocation Mode 2 or whether to use resource allocation Mode 1 for SL communication. In various embodiments, a V2X UE configured for Mode 1 and Mode 2 concurrently may perform CBR measurements in a resource pool configured for Mode 2. If a CBR value is below or equal to the configured CBR threshold then the UE may, in one example, use resource allocation Mode 2 for SL communication; and if the CBR value is higher than the threshold then the UE may, in one example, use resource allocation Mode 1 for the SL communication. The CBR threshold may be broadcast in a serving cell or configured individually for a UE.

In a second embodiment, a V2X transmitting UE may consider only sidelink logical channels for buffer status reporting and/or a scheduling request procedure that are configured to use resource allocation Mode 1 (e.g., sidelink grant is signaled and/or provided by a NE such as a gNB). In such an embodiment, each SLRB and/or the corresponding SL LCHs may be configured with a supported resource allocation mode (e.g., IE allowedResourceAllocationMode). This configuration may indicate whether data of a corresponding SL LCH and/or SLRB may be transmitted on a SL-SCH using a SL grant allocated by a network entity such as gNB (e.g., Mode 1), autonomously selected by the UE (e.g., Mode 2), or both. In certain configurations of the second embodiment, sidelink LCHs may be configured to use only resource allocation Mode 2 (e.g., SL grant is autonomously selected by a TX UE) and are not considered for MAC buffer status reporting. In such embodiments, SL LCHs configured to use only autonomous resource allocation cannot trigger a buffer status report (e.g., sidelink data arrival for a sidelink logical channel configured to use only autonomous resource allocation may not trigger a BSR and/or SR). In various embodiments, a sidelink buffer status report does not reflect an amount of sidelink data for logical channels configured to use only the autonomous resource allocation mode. In such embodiments, the sidelink BSR indicates only an amount of data for sidelink logical channels that are configured to use the resource allocation Mode 1 (e.g., sidelink grant is provided by the network). In other words, an amount of data for sidelink LCHs configured for autonomous resource allocation mode is set to zero.

In one configuration of the second embodiment, sidelink LCHs that are configured for an autonomous resource allocation mode are reported in a buffer status report. However, in such configurations, the buffer status for SL LCHs configured for the scheduled resource allocation mode (e.g., Mode 1) may be reported separately from the buffer status of the SL LCHs configured for the autonomous resource allocation mode (e.g., Mode 2).

In some embodiments, a V2X transmitting UE performs two sidelink transmission procedures in parallel. In such embodiments, one transmission procedure is for a gNB scheduled resource selection mode (e.g., Mode 1 in which a MAC entity is configured to receive a sidelink grant dynamically on a PDCCH) and another transmission procedure is for a UE autonomous resource selection mode (e.g., Mode 2 in which the MAC entity is configured for autonomous resource selection). In such embodiments, the serving cell or cells support both resource selection modes (e.g., Mode 1 and Mode 2) for V2X sidelink communication. Performing two sidelink transmission procedures concurrently may imply that a V2X transmitting UE first sends a BSR and/or SR (e.g., indicating an amount of SL data of all SL LCHs and/or SLRBs available for transmission) to a gNB asking for SL resources if there is SL data available for transmission and the UE has no valid SL grant, and subsequently monitors the PDCCH for a SL grant. Upon reception of a SL grant, the UE performs a SL transmission on the assigned resources. If there is still SL data pending in the UE's buffer after the SL-SCH transmission, the UE may send the remaining data on SL resources autonomously selected by the UE (e.g., based on sensing). It should be noted that the UE is not enabled to perform any SL transmissions on UE autonomously selected resources (e.g., Mode 2) after the UE has sent a BSR to the gNB and before the corresponding SL grant has been received. As may be appreciated, the motivation for this behavior is may be to avoid a situation in which the SL data in the UE's buffer is less than indicated in the BSR upon reception of a SL grant on PDCCH because the UE sent some SL data autonomously (e.g., Mode 2) after transmission of the BSR and before the reception of the corresponding SL grant.

In various embodiments, a V2X transmitting UE may first send SL data on UE selected SL resources (e.g., based on sensing if there is SL data available for transmission and the UE has no valid SL grant). If there is still SL data remaining in the UE's buffer after the transmission in resource allocation Mode 2, the UE may send a BSR and/or SR to the gNB indicating the remaining SL data and subsequently monitor for a SL grant on PDCCH. In such embodiments, the UE may not be enabled to perform any SL transmissions on UE autonomously selected resources (e.g., Mode 2) after the UE has sent a BSR to the gNB and before the corresponding SL grant has been received. As may be appreciated, the motivation for this behavior may be to avoid a situation in which the SL data in a UE's buffer is less than indicated in a BSR upon reception of a SL grant on PDCCH because the UE sent some SL data autonomously (e.g., Mode 2) after transmission of the BSR and before the reception of the corresponding SL grant.

In a third embodiment, a V2X transmitting UE excludes subframes and/or slots from a list of potential transmitting subframes and/or slots (e.g., based on sensing or partial sensing) for a transmission in an autonomous resource allocation mode for which the UE has received a SL grant from a NE (e.g., by means of a PDCCH). In such an embodiment, the UE may not select a SL resource in a slot if it has been allocated SL resources by a SL grant (e.g., a SL grant allocated by the NE—Mode 1—may be prioritized over a UE selected SL grant—Mode 2). In such an embodiment, the UE has data available for transmission for the scheduled resource allocation mode as well as for the autonomous resource allocation mode (e.g., the UE has more data available for transmission than it is allowed to transmit according to the SL grant issued by the NE).

In some embodiments, for scenarios in which a V2X transmitting UE (e.g., a MAC entity of the UE) is configured to receive a sidelink grant dynamically on a PDCCH (e.g., scheduled resource allocation mode—Mode 1) and is simultaneously configured with an autonomous resource allocation mode, the UE performs both resource allocation mode related operations in parallel. In such embodiments, the UE is only enabled and/or capable of performing (e.g., in a serving cell in one slot) one SL transmission on a SL-SCH (e.g., either a SL-SCH transmission according to the scheduled resource allocation mode or a transmission on the SL-SCH according the autonomous resource allocation mode). Moreover, in such embodiments the UE behavior may be defined for cases if the UE has for the same slot (e.g., partial or fully overlapping) with a SL grant allocated by the PDCCH as well as a SL grant selected autonomously (e.g., based on sensing). In certain embodiments, a UE prioritizes a SL grant received by PDCCH over SL grants selected autonomously (e.g., based on sensing or partial sensing). If the UE has two SL grants (e.g., one received by PDCCH and one selected autonomously such as based on sensing) for the same slot, the UE performs a SL transmission according to the SL grant received by PDCCH.

In various embodiments, the UE selects a SL grant for a SL transmission based on a priority of LCHs contained in corresponding TBs. If a highest priority LCH contained in a TB according to a SL grant received by PDCCH has a higher priority than a priority of a highest priority LCH contained in a TB according to the SL grant selected autonomously by the UE, the UE may select the SL grant received by PDCCH and transmit accordingly. If the highest priority LCH contained in the TB according to the SL grant received by PDCCH has a lower priority than the priority of the highest priority LCH contained in the TB according to the SL grant selected autonomously by the UE, the UE may select the SL grant selected autonomously and transmit accordingly (the SL grant received by PDCCH may be ignored for such cases).

In certain embodiments, a UE may use SL resources scheduled by a gNB and may send data of LCHs configured for autonomous transmission if a priority of the LCHs configured for autonomous resource allocation mode is higher than the priority of the LCHs configured for the scheduled resource allocation mode. In such embodiments, each LCH may be configured for an enabled resource allocation mode based on the first embodiment.

In a fourth embodiment, a gNB may configure different power control parameters (e.g., $P_O$ and/or $\alpha$ values) for SL transmissions for a SL grant received by PDCCH and for SL transmissions for a SL grant selected autonomously by a UE (e.g., based on sensing). In certain embodiments, a UE may have two independent power control loops for the two resource allocation modes (e.g., TPC commands maintained separately for the two resource allocation modes). In such embodiments, one motivation for having different power control parameters and having two independent power control loops may be that there are different QoS requirements to be satisfied by the two resource allocation modes. If a UE transmits according to one of the two resource allocation modes, the UE may apply the corresponding power control loop and/or parameters for determining the used transmit power of the PSSCH.

In some embodiments, if a UE is power limited (e.g., determined TX for SL transmissions on PSSCH exceeds a total maximum allowed UE TX power—for SL), the UE may reduce the TX power of certain PSSCHs (e.g., referred to as power scaling) thereby considering a resource allocation mode of corresponding PSSCH transmissions. Such power limitation may happen if a UE is configured with multiple uplink carriers in a carrier aggregation scenario or if the UE is configured for simultaneous uplink transmission of LTE and NR in a dual connectivity scenario. In certain embodiments, a UE may prioritize PSSCH transmissions scheduled by a gNB over PSSCH transmissions on resources selected by the UE autonomously if power scaling is applied. In various embodiments, a relative priority order between SL transmissions on PSSCH may be used for a power limited case (e.g., power scaling). In some embodiments, PSSCH transmissions scheduled by a gNB may be prioritized over PSSCH transmissions allocated autonomously by a transmitting UE. In certain embodiments a UE may scale down a transmission power of PSSCH transmissions allocated autonomously by the UE before reducing the transmission power of a PSSCH transmission scheduled by a gNB.

In a fifth embodiment, a transmitting V2X UE may switch a resource allocation mode between different HARQ transmissions (or retransmissions) of a TB. In such an embodiment, an initial HARQ transmission of a TB may be done on a SL resource selected autonomously by the UE (e.g., Mode 2), and a subsequent HARQ transmission (or retransmission) of this TB may be explicitly scheduled by the gNB (e.g., by means of a SL grant sent via PDCCH). In some embodiments, because a SL grant for an initial HARQ transmission is selected by a UE, a gNB may not be aware of transmission parameters selected by the UE for the initial TX (e.g., TB size, HARQ process ID, etc.). Therefore, to schedule the HARQ retransmission, the UE provides the gNB with the selected transmission parameters if requesting SL resources for a HARQ retransmission. In various embodiments, a UE signals to a gNB at least one of the following parameters in order to request SL resources for a HARQ retransmission: 1) a TB size of an initial HARQ transmission; 2) a HARQ process ID used for the initial HARQ transmission of the TB (e.g., assumption is that the UE selects the HARQ process ID autonomously for a SL transmission according to the autonomous resource allocation mode); 3) an ID of a highest priority LCH contained within the TB; and/or 4) a priority of the highest priority LCH contained within the TB.

In certain embodiments, a gNB, upon receiving a scheduling request for a HARQ retransmission together with the transmission parameters, sends a SL grant on PDCCH to a requesting UE allocating SL resource for the HARQ retransmission (e.g., the TB size should match the size indicated in the retransmission request message from the UE). In various embodiments, DCI contains an indicator identifying that a SL grant is allocating resources for a retransmission. In such embodiments, the DCI may indicate a HARQ process ID signaled from a UE to a gNB within a retransmission request message.

In some embodiments, an initial HARQ transmission of a TB is done on a SL resource scheduled by a gNB (e.g., Mode 1), and a subsequent HARQ transmission (e.g., retransmission) of this TB is sent on SL resources selected by the UE (e.g., based on sensing). In certain embodiments, if a V2X transmitting UE is configured with a feedback resource (e.g., on PUCCH) to provide a gNB with information about whether a SL resource for transmitting a HARQ retransmission of a TB is required, the UE may refrain from indicating a need for a retransmission SL grant if the HARQ retransmission is performed in an autonomous resource allocation mode. Such information may be either explicit (e.g., similar to HARQ ACK), or implicitly by the absence of a retransmission request. In various embodiments, an absence of a configured feedback resources for a SL grant received on PDCCH (e.g., to indicate whether SL resources for a retransmission of the TB is necessary) implicitly orders a V2X transmitting UE to perform any potential HARQ retransmission of a TB for which the initial transmission was scheduled by gNB (e.g., SL grant on PDCCH) on SL resources selected by the UE autonomously (e.g., based on sensing).

In various embodiments, a SL grant sent by a gNB on PDCCH may explicitly indicate whether potential HARQ retransmission may be performed in an autonomous resource allocation mode. Such an indication may be done using a one-bit flag within DCI.

Figure 4:
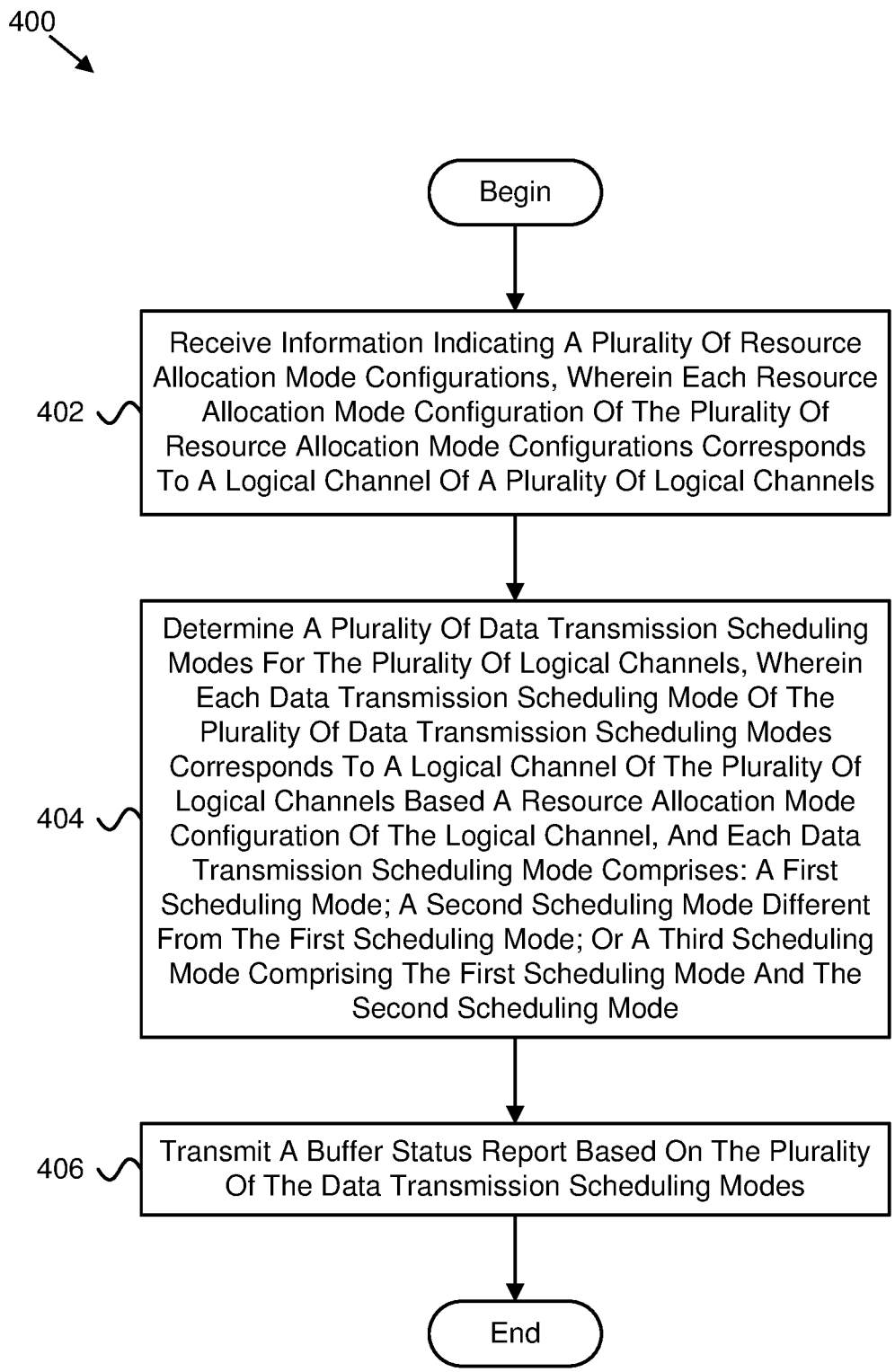
FIG. 4 is a flow chart diagram illustrating one embodiment of a method for multiple resource allocation mode configurations.

FIG. 4 is a flow chart diagram illustrating one embodiment of a method 400 for multiple resource allocation mode configurations. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include receiving 402 information indicating a plurality of resource allocation mode configurations, wherein each resource allocation mode configuration of the plurality of resource allocation mode configurations corresponds to a logical channel of a plurality of logical channels. In some embodiments, the method 400 includes determining 404 a plurality of data transmission scheduling modes for the plurality of logical channels, wherein each data transmission scheduling mode of the plurality of data transmission scheduling modes corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode. In various embodiments, the method 400 includes transmitting 406 a buffer status report based on the plurality of the data transmission scheduling modes.

In certain embodiments, transmitting the buffer status report based on the plurality of the data transmission scheduling modes comprises only including data for logical channels of the plurality of logical channels if the data transmission scheduling mode of the logical channels comprises the first scheduling mode. In some embodiments, transmitting the buffer status report based on the plurality of the data transmission scheduling modes comprises including data for all logical channels of the plurality of logical channels. In various embodiments, the method 400 further comprises triggering the transmission of the buffer status report in response to logical channels of the plurality of logical channels that have a data transmission scheduling mode comprising the first scheduling mode.

In one embodiment, a sidelink grant received by a control channel has a higher priority than an autonomously generated sidelink grant. In certain embodiments, the method 400 further comprises receiving a sidelink grant from a base unit, wherein, in response to receiving the sidelink grant from the base unit, data for logical channels of the plurality of logical channels is only included if the data transmission scheduling mode of the logical channels comprises the first scheduling mode. In some embodiments, the method 400 further comprises selecting a sidelink grant, wherein, in response to selecting the sidelink grant, data for logical channels of the plurality of logical channels is only included if the data transmission scheduling mode of the logical channels comprises the second scheduling mode.

In various embodiments, sidelink resources scheduled by a base unit are preempted by an autonomous transmission in response to autonomous data corresponding to the autonomous transmission having a higher priority than scheduled data corresponding to the sidelink resources. In one embodiment, the first scheduling mode comprises a first power control loop and the second scheduling mode comprises a second power control loop, and the first power control loop is independent from the second power control loop. In certain embodiments, the first scheduling mode comprises a first power control loop and the second scheduling mode comprises a second power control loop, and the first power control loop and the second power control loop are related to one another.

In some embodiments, the method 400 further comprises transmitting initial feedback using the first scheduling mode and retransmitting feedback using the second scheduling mode. In various embodiments, the method 400 further comprises transmitting initial feedback using the second scheduling mode and retransmitting feedback using the first scheduling mode.

In one embodiment, a method comprises: receiving information indicating a plurality of resource allocation mode configurations, wherein each resource allocation mode configuration of the plurality of resource allocation mode configurations corresponds to a logical channel of a plurality of logical channels; determining a plurality of data transmission scheduling modes for the plurality of logical channels, wherein each data transmission scheduling mode of the plurality of data transmission scheduling modes corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode; and transmitting a buffer status report based on the plurality of the data transmission scheduling modes.

In certain embodiments, transmitting the buffer status report based on the plurality of the data transmission scheduling modes comprises only including data for logical channels of the plurality of logical channels if the data transmission scheduling mode of the logical channels comprises the first scheduling mode.

In some embodiments, transmitting the buffer status report based on the plurality of the data transmission scheduling modes comprises including data for all logical channels of the plurality of logical channels.

In various embodiments, the method further comprises triggering the transmission of the buffer status report in response to logical channels of the plurality of logical channels that have a data transmission scheduling mode comprising the first scheduling mode.

In one embodiment, a sidelink grant received by a control channel has a higher priority than an autonomously generated sidelink grant.

In certain embodiments, the method further comprises receiving a sidelink grant from a base unit, wherein, in response to receiving the sidelink grant from the base unit, data for logical channels of the plurality of logical channels is only included if the data transmission scheduling mode of the logical channels comprises the first scheduling mode.

In some embodiments, the method further comprises selecting a sidelink grant, wherein, in response to selecting the sidelink grant, data for logical channels of the plurality of logical channels is only included if the data transmission scheduling mode of the logical channels comprises the second scheduling mode.

In various embodiments, sidelink resources scheduled by a base unit are preempted by an autonomous transmission in response to autonomous data corresponding to the autonomous transmission having a higher priority than scheduled data corresponding to the sidelink resources.

In one embodiment, the first scheduling mode comprises a first power control loop and the second scheduling mode comprises a second power control loop, and the first power control loop is independent from the second power control loop.

In certain embodiments, the first scheduling mode comprises a first power control loop and the second scheduling mode comprises a second power control loop, and the first power control loop and the second power control loop are related to one another.

In some embodiments, the method further comprises transmitting initial feedback using the first scheduling mode and retransmitting feedback using the second scheduling mode.

In various embodiments, the method further comprises transmitting initial feedback using the second scheduling mode and retransmitting feedback using the first scheduling mode.

In one embodiment, an apparatus comprises: a receiver that receives information indicating a plurality of resource allocation mode configurations, wherein each resource allocation mode configuration of the plurality of resource allocation mode configurations corresponds to a logical channel of a plurality of logical channels; a processor that determines a plurality of data transmission scheduling modes for the plurality of logical channels, wherein each data transmission scheduling mode of the plurality of data transmission scheduling modes corresponds to a logical channel of the plurality of logical channels based a resource allocation mode configuration of the logical channel, and each data transmission scheduling mode comprises: a first scheduling mode; a second scheduling mode different from the first scheduling mode; or a third scheduling mode comprising the first scheduling mode and the second scheduling mode; and a transmitter that transmits a buffer status report based on the plurality of the data transmission scheduling modes.

In certain embodiments, the transmitter transmitting the buffer status report based on the plurality of the data transmission scheduling modes comprises only including data for logical channels of the plurality of logical channels if the data transmission scheduling mode of the logical channels comprises the first scheduling mode.

In some embodiments, the transmitter transmitting the buffer status report based on the plurality of the data transmission scheduling modes comprises including data for all logical channels of the plurality of logical channels.

In various embodiments, the processor triggers the transmission of the buffer status report in response to logical channels of the plurality of logical channels that have a data transmission scheduling mode comprising the first scheduling mode.

In one embodiment, a sidelink grant received by a control channel has a higher priority than an autonomously generated sidelink grant.

In certain embodiments, the receiver receives a sidelink grant from a base unit, and, in response to receiving the sidelink grant from the base unit, data for logical channels of the plurality of logical channels is only included if the data transmission scheduling mode of the logical channels comprises the first scheduling mode.

In some embodiments, the processor selects a sidelink grant, and, in response to selecting the sidelink grant, data for logical channels of the plurality of logical channels is only included if the data transmission scheduling mode of the logical channels comprises the second scheduling mode.

In various embodiments, sidelink resources scheduled by a base unit are preempted by an autonomous transmission in response to autonomous data corresponding to the autonomous transmission having a higher priority than scheduled data corresponding to the sidelink resources.

In one embodiment, the first scheduling mode comprises a first power control loop and the second scheduling mode comprises a second power control loop, and the first power control loop is independent from the second power control loop.

In certain embodiments, the first scheduling mode comprises a first power control loop and the second scheduling mode comprises a second power control loop, and the first power control loop and the second power control loop are related to one another.

In some embodiments, the transmitter transmits initial feedback using the first scheduling mode and retransmitting feedback using the second scheduling mode.

In various embodiments, the transmitter transmits initial feedback using the second scheduling mode and retransmitting feedback using the first scheduling mode.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication, the apparatus comprising:
   a processor; and
   a memory coupled to the processor, the processor configured to cause the apparatus to:
      receive a sidelink grant comprising a sidelink resource allocation;
      determine a set of sidelink resources based at least in part on the sidelink resource allocation;
      select a subset of sidelink logical channels from a set of sidelink logical channels based on a sidelink mode of a set of sidelink modes, wherein the subset of sidelink logical channels is configured for the sidelink mode;
      perform a prioritization procedure for the subset of sidelink logical channels that are configured for the sidelink mode; and
      transmit a sidelink transmission via a sidelink channel on at least one sidelink resource of the set of sidelink resources based at least in part on the prioritization procedure.

2. The apparatus of claim 1, wherein the prioritization procedure comprises a logical channel prioritization (LCP) procedure.

3. The apparatus of claim 1, wherein, to transmit the sidelink transmission, the processor is configured to cause the apparatus to transmit a medium access control (MAC) protocol data unit (PDU) via the sidelink channel on the at least one sidelink resource of the set of sidelink resources.

4. The apparatus of claim 1, wherein the apparatus comprises a vehicle-to-everything (V2X) UE.

5. The apparatus of claim 1, wherein the sidelink grant is received from a base station.

6. The apparatus of claim 1, wherein, to receive sidelink grant, the processor is configured to cause the apparatus to receive the sidelink grant on a physical downlink control channel (PDCCH).

7. The apparatus of claim 1, wherein the prioritization procedure comprises a transport block (TB) generation procedure.

8. The apparatus of claim 1, wherein, to transmit the sidelink transmission, the processor is configured to cause the apparatus to transmit a transport block (TB) via the sidelink channel on the at least one sidelink resource of the set of sidelink resources.

9. A method at a user equipment (UE), the method comprising:
   receiving a sidelink (SL) grant comprising a sidelink resource allocation;
   determining a set of sidelink resources based at least in part on the sidelink resource allocation;
   selecting a subset of sidelink logical channels from a set of sidelink logical channels based on a sidelink mode of a set of sidelink modes, wherein the subset of sidelink logical channels is configured for the sidelink mode;
   performing a prioritization procedure for the subset of sidelink logical channels that are configured for the sidelink mode; and
   transmitting a sidelink transmission via a sidelink channel on at least one sidelink resource of the set of sidelink resources based at least in part on the prioritization procedure.

10. The method of claim 9, wherein the prioritization procedure comprises a logical channel prioritization (LCP) procedure.

11. The method of claim 9, wherein transmitting the sidelink transmission comprises transmitting a medium access control (MAC) protocol data unit (PDU) via the sidelink channel on the at least one sidelink resource of the set of sidelink resources.

12. The method of claim 9, wherein the UE comprises a vehicle-to-everything (V2X) UE.

13. The method of claim 9, wherein the sidelink grant is received from a base station.

14. The method of claim 9, wherein receiving the sidelink grant comprises receiving the sidelink grant on a physical downlink control channel (PDCCH).

15. The method of claim 9, wherein the prioritization procedure comprises a transport block (TB) generation procedure.

16. The method of claim 9, wherein transmitting the sidelink transmission comprises transmitting a transport block (TB) via the sidelink channel on the at least one sidelink resource of the set of sidelink resources.

* * * * *